United States Patent [19]

Kupcikevicius et al.

[11] E Re. 30,390

[45] Reissued Sep. 2, 1980

[54] STUFFING APPARATUS

[75] Inventors: Vytautas Kupcikevicius, Chicago; Anton L. Mika, Downers Grove, both of Ill.

[73] Assignee: Union Carbide Corporation, New York, N.Y.

[21] Appl. No.: 939,137

[22] Filed: Sep. 1, 1978

Related U.S. Patent Documents

Reissue of:

[64] Patent No.: 4,044,426
Issued: Aug. 30, 1977
Appl. No.: 627,252
Filed: Oct. 30, 1975

[51] Int. Cl.[2] ..... A22C 11/02

[52] U.S. Cl. ..... 17/49; 17/41; 17/35

[58] Field of Search ..... 17/41, 33, 34, 35, 49

[56] References Cited

U.S. PATENT DOCUMENTS

| | | | |
|---|---|---|---|
| 3,553,769 | 1/1971 | Myles et al. | 17/41 |
| 3,621,513 | 11/1971 | Kupcikevicius | 17/35 |
| 3,659,317 | 5/1972 | Kupcikevicius | 17/41 |
| 3,748,690 | 7/1973 | Niedecker | 17/33 |
| 3,805,329 | 4/1924 | Kollross | 17/33 |
| 3,860,996 | 1/1975 | Kupcikevicius et al. | 17/49 |

*Primary Examiner*—Willie G. Abercrombie
*Attorney, Agent, or Firm*—Maurice W. Ryan

[57] ABSTRACT

Apparatus and method for stuffing viscous food product into a shirred tubular casing article containing a casing diameter sizing means confined within an unshirred portion of one closed end, comprising means to stretch-size and snub the casing to a predetermined diameter as it is being stuffed and control means to regulate the shape of the leading end and trailing end portions of a clip closed food product.

57 Claims, 16 Drawing Figures

138
116
F''
F
D
F'
74
113
114
112
110
LY
L
LX
82
98
96
75
74
62a
A'
94
18
34
94b
100
62b
62
98
96
16
58
48
48
18
46
52
61
63
54
56
10
14

138
116
DY
D
DX
A''
LY
LX
L
98
82
96
75
74
62a
A'
74
18
34
94b
100
62b
62
98
96
114
112
113
110
16
58
48
48
18
46
52
61
63
54
56
10
14

138
115
116
74
114
113
112
110
D
A
A'
A''
98
82
96
94
74
62a
18
75
34
94b
100
72
62b
62
96
98
$L^X$
L
$L^Y$
16
48
48
18
46
52
61
63
54
56
14

108
84
80
86
78
82
102
94
100
86'
84'
84
80
86
106
62
68
22
70
36
70
68
62a
62b
86'
106'
84'
104
10
103
108

STUFFING APPARATUS

Matter enclosed in heavy brackets [ ] appears in the original patent but forms no part of this reissue specification; matter printed in italics indicates the additions made by reissue.

This invention relates to an apparatus and method for producing a food product and more particularly to an apparatus and method for controlling the uniformity of stuffed diameter and conformation of the terminal ends of a sausage product.

In the meat packing industry, techniques are known for the automatic and semiautomatic filling of various types of casings with viscous meat emulsion. In general, these techniques include positioning a shirred continuous film casing length over a stuffing horn and thereafter continuously deshirring the casing and stuffing the deshirred casing with viscous meat emulsion fed under pressure through the stuffing horn and into the casing interior. As used herein, the term casing or tubular casing is intended to mean tubing of natural or manufactured materials, and the term "casing length" is intended to mean continuous tubular casing lengths. Shirred tubular casings are also known to persons familiar with the art as "sticks", such "sticks" being long lengths of casing having a substantially large bore, which have been shirred and compressed into short compact self-sustaining lengths, or which may be a package of shirred and compressed casing sheathed inside a retaining sleeve. Apparatus and processes are well known in the food casing art for producing shirred tubular cellulosic food casings such as, for example, the apparatus and processes disclosed in U.S. Pat. Nos. 2,983,949 and 2,984,574 to Matecki. These apparatus may be employed in the preparation of pleated and compressed tubular casings wherein the compression ratios (unshirred to shirred stick length) are in the order of at least about 40:1 and up to about 100:1 or even greater. Using suitable food stuffing machinery, casing lengths can be stuffed and formed into unit size links of particulate or comminuted viscous materials, such as meat emulsions, or the like.

In the art of producing sausages and similar food products, the finely divided meat compositions commonly referred to as emulsions, are conventionally stuffed into the tubular casing materials of long length which, as stated above, may be of natural or manufactured materials. Large sausage products used in slicing for multislice package putup are usually made in casings which range in size from the trade designation No. 6 (101 mm. diameter) to No. 9 (129 mm. diameter). In the production of large sausage products, a clip closed end casing of precut length is first manually sheathed over the end of a stuffing horn and then stuffed with a food emulsion. The stuffed casing is then tied, twisted or clipped into predetermined unit length cylindrical packages.

The thusly stuffed and encased food emulsion is subsequently cooked and cured according to conventional processes. A large percentage of these large sausage products are thereafter sliced and packaged into units of predetermined weight and slice count for retail sale. The high speed slicing devices employed in such packaging operations are pre-set to yield a specific weight-by-slice count for use in obtaining unit packages of equal weight. Therefore an important aspect of a commercially acceptable large sausage product is that the tubular finished processed sausage product have a substantially uniform diameter from end to end and in successive pieces of the same designated size. Moreover, the diameter of the slices must be uniformly precise in order to assure that the slices will fit into the preformed rigid packaging frequently used.

Since a large sausage casing stuffed with a food emulsion has two generally hemispherical, rounded ends, these rounded ends are generally not used in producing equal weight packages and are either discarded or reworked. Thus another aspect of importance commercially, is to have a large sausage casing stuffed with uniform tight ends, to thereby minimize the amount of food product cut off from the cylindrical portion.

Years of commercial utilization of manufactured sausage casings such as prepared from unsupported or fibrous reinforced cellulose have provided with experience for determining optimum stuffing and processing conditions for various classes of sausage product. Sausage generally needs to be encased or stuffed to "green" or unprocessed diameters that have been selected and recommended for such optimum performance. The recommended stuffing diameter for each size and type of casing has been established and tabulated in recommended operating procedures determined by the casing manufacturer for guidance of the sausage maker.

When a casing is understuffed from the recommended "green" diameter, the result generally is a processed product that is not uniform in diameter from end to end and from piece to piece; the product is undesirably wrinkled in appearance; and the processed sausage may have an emulsion breakdown yielding undesirable pockets of fat or liquid.

When a casing is overstuffed from the recommended "green" diameter, the casing may split or break apart at the stuffing station or subsequently, in transport to or in the cooking/smoking processing operations. This results in a costly waste of meat and in the labor expense for cleanup.

For many years, the apparatus and methods employed to prepare the encased food products and particularly food products encased in large diameter casing have relied upon manual manipulation in controlling the stuffing of food emulsion into predetermined length sausage links or packages. Recently, advances in the art have resulted in the introduction of apparatus for machine control of the stuffing operation which have provided means for preparing uniformly sized encased products such as disclosed, for example, in U.S. Pat. Nos. 2,871,508, 2,999,270, 3,264,679, 3,317,950, 3,454,980, 3,457,588, 3,553,769, 3,621,513, 3,659,317 and 3,751,764.

Although many of the prior art stuffing devices generally provide a fairly wide range of adjustment for producing stuffed casings of desired diameter, the adjustments are usually left to the judgment of the operator, thereby resulting in understuffing or overstuffing caused by deviation from the optimum size recommended by the casing manufacturer. In addition, the prior art devices do not have means for controlling the shape and tightness of stuffing for both the leading and trailing ends of the stuffed casing.

It is therefore an object of this invention to provide a method and apparatus for stuffing a shirred casing article with viscous food emulsion.

Another object of this invention is to provide a method and apparatus for stuffing a preshirred sausage casing article to yield a product of uniform size, shape and quality.

Another object of this invention is to provide a method and apparatus for regulating the shape or conformation of the leading and trailing closed end portions of a stuffed casing.

A further object of this invention is to provide means to stuff a sausage casing to a predetermined recommended diameter for a specific size of casing and to limit the range of stuffing over or under a predetermined recommended diameter.

Still another object of this invention is to provide means for stuffing a sausage casing with pressurized food emulsion using a preshirred casing article containing a stretch/sizing disc of predetermined design, in combination with a limiting type letoff, snubbing or restraining means, and apparatus control means to regulate the shape or conformation of leading and trailing closed end portions of stuffed casing, thus providing processed sausage products of uniform size, shape and quality.

The apparatus and method of the present invention will become apparent from the following description thereof when considered together with the accompanying drawing which is set forth as being exemplary of one embodiment of the present invention and is not intended, in any way, to be limitative thereof and wherein.

Figure 1:
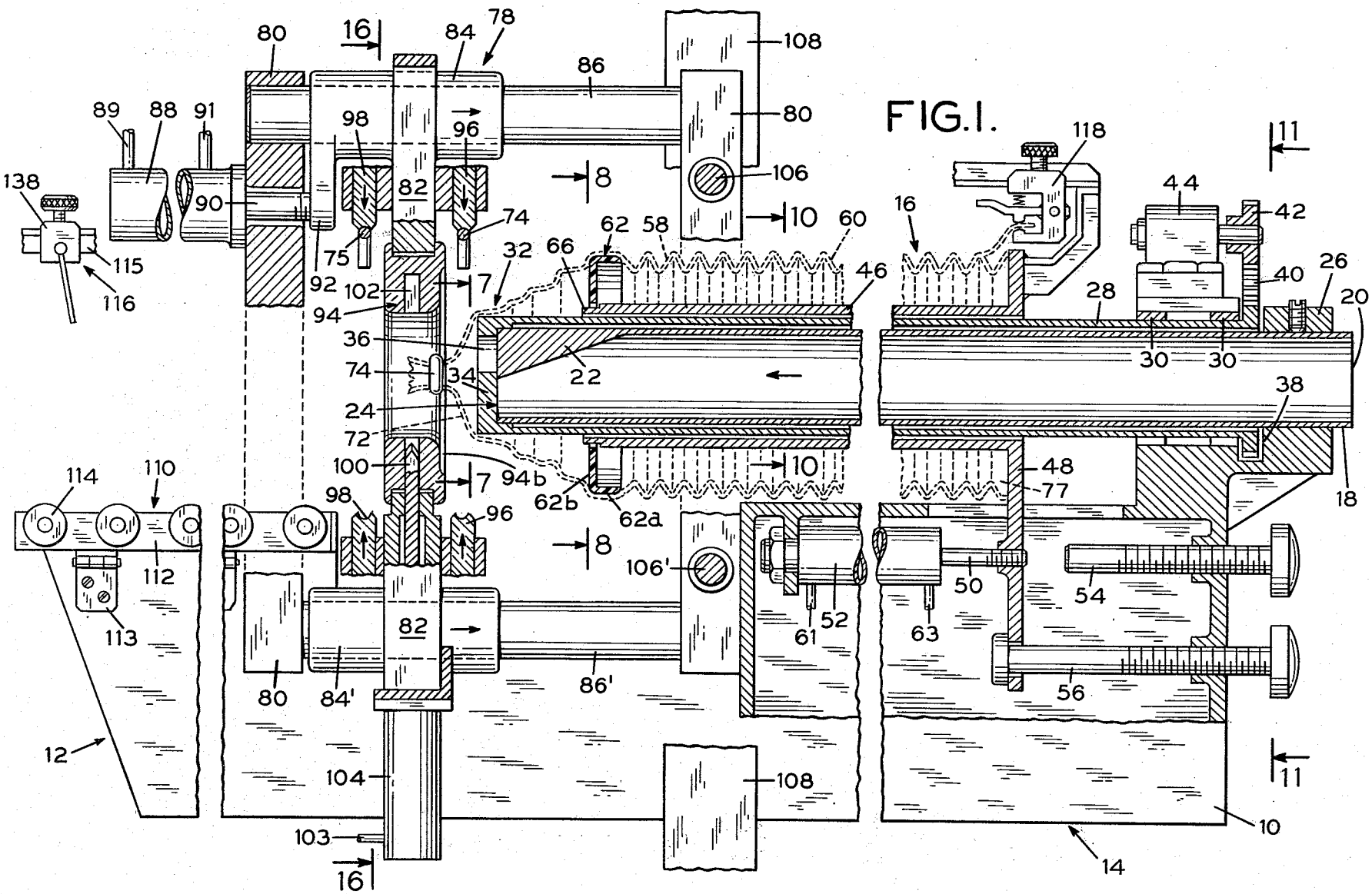
FIG. 1 is a side elevational view partly in section, of one embodiment of the apparatus of the present invention.
Figure 3:
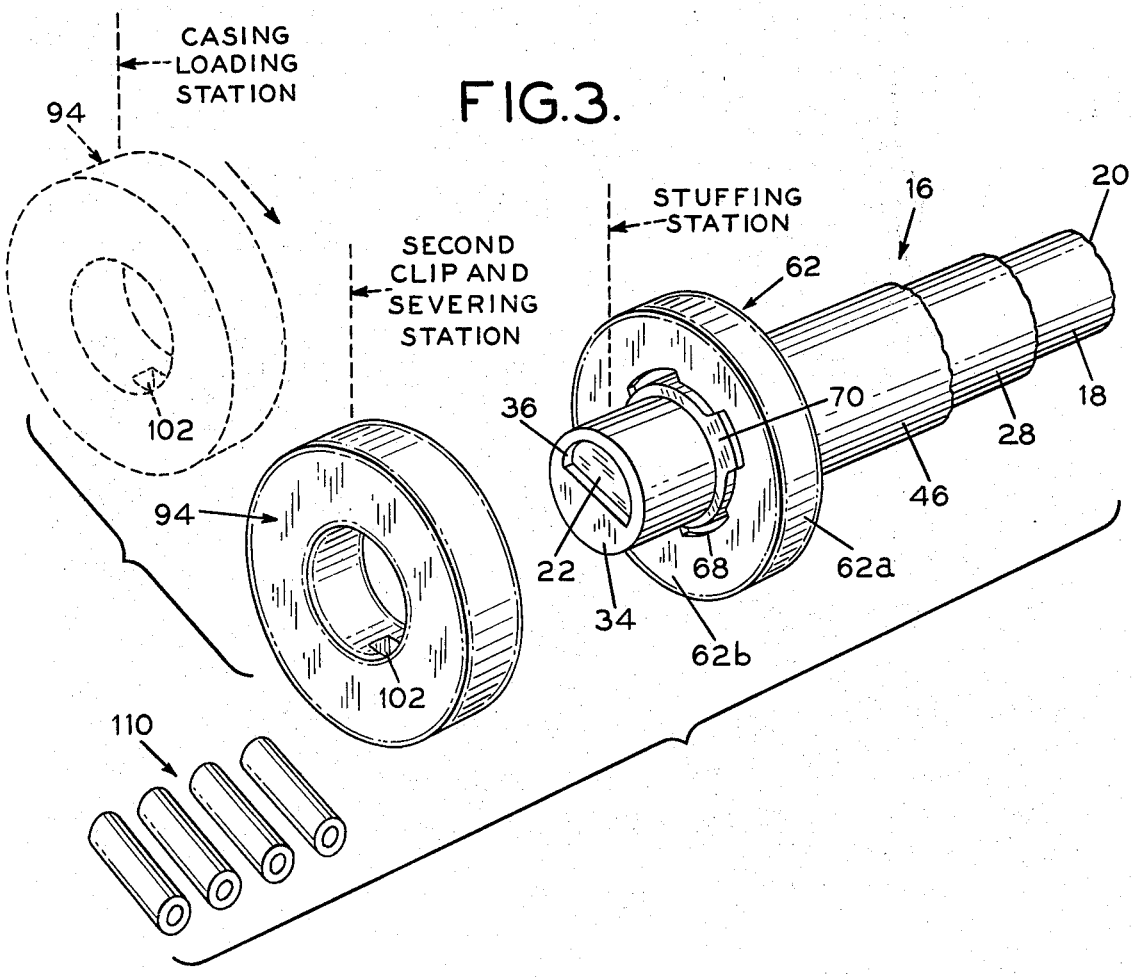
Figure 4:
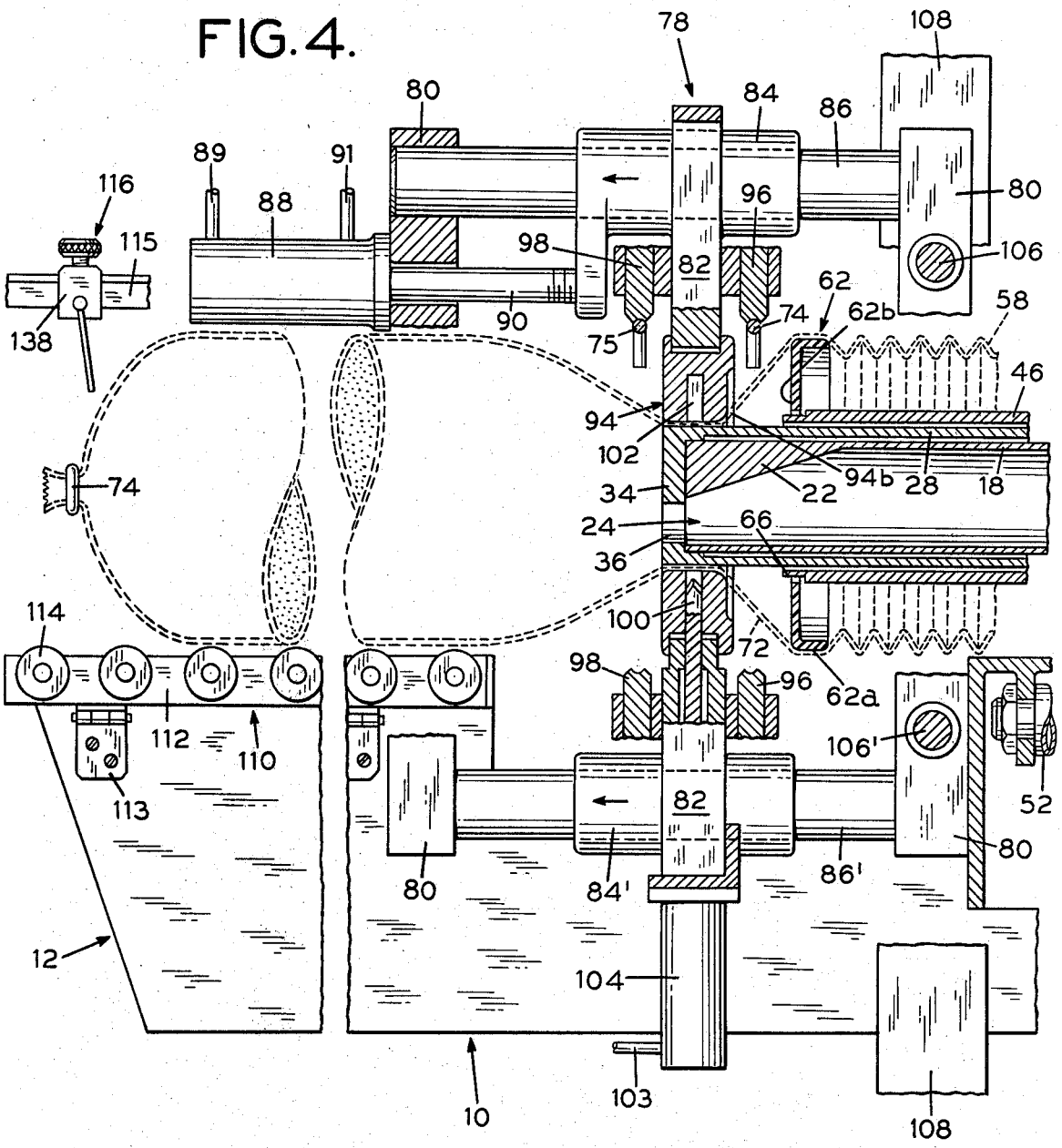
Figure 5:
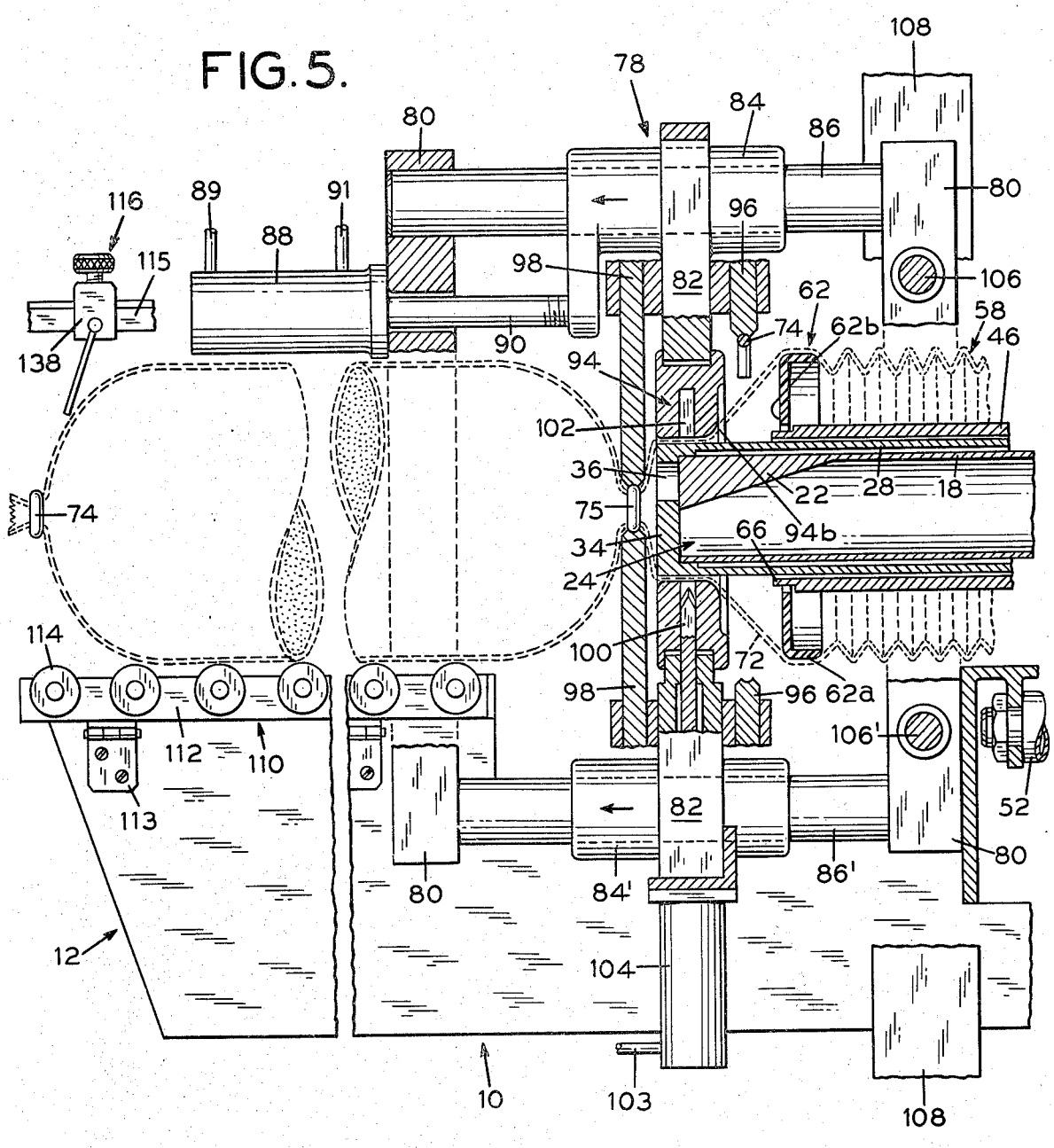
Figure 6:
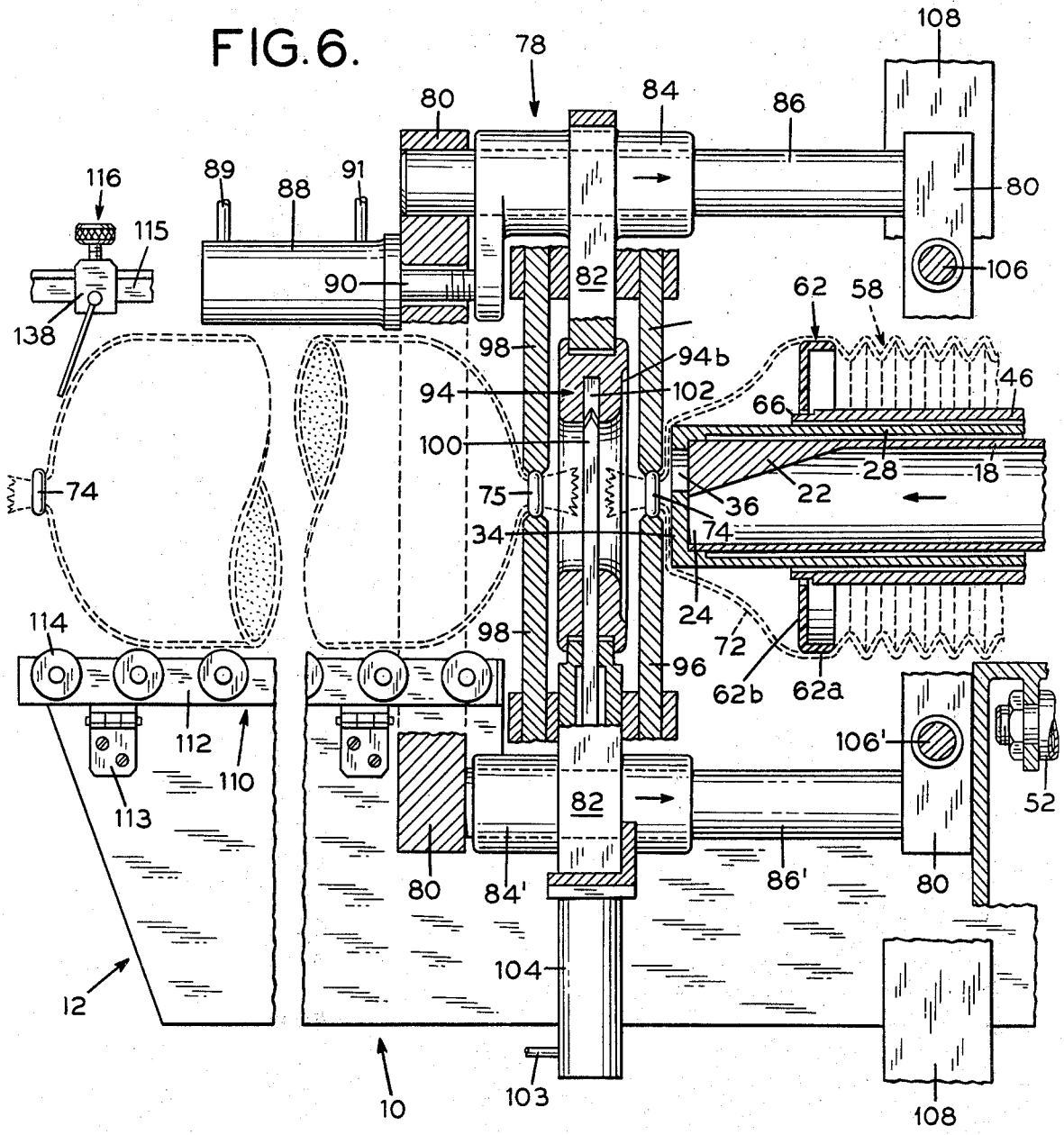
Figure 7:
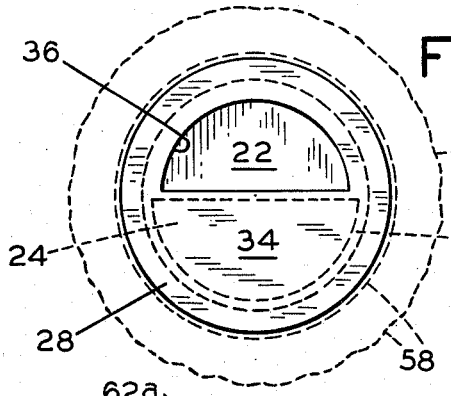
Figure 8:
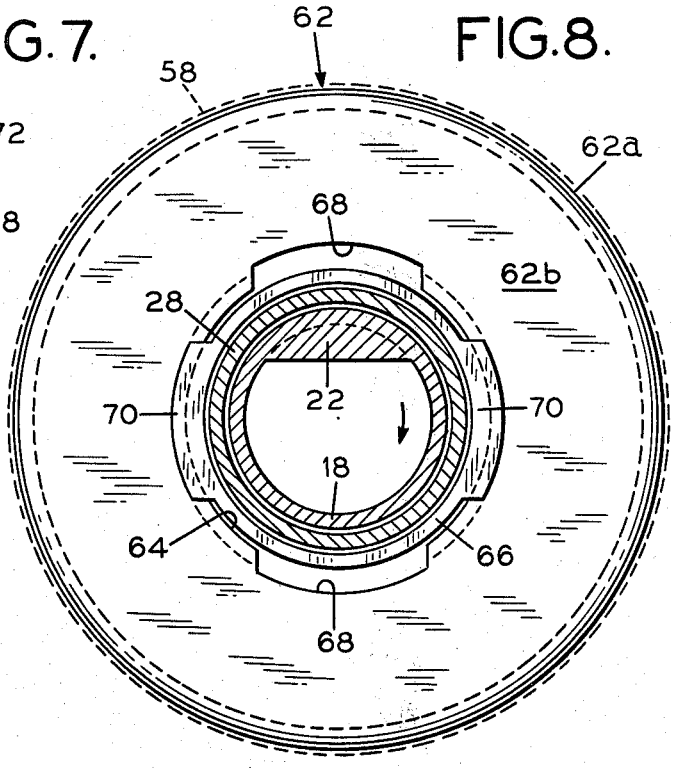
Figure 9:
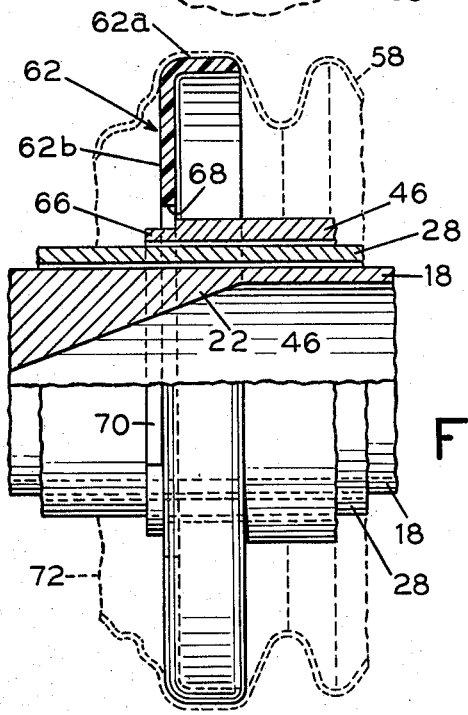
Figure 10:
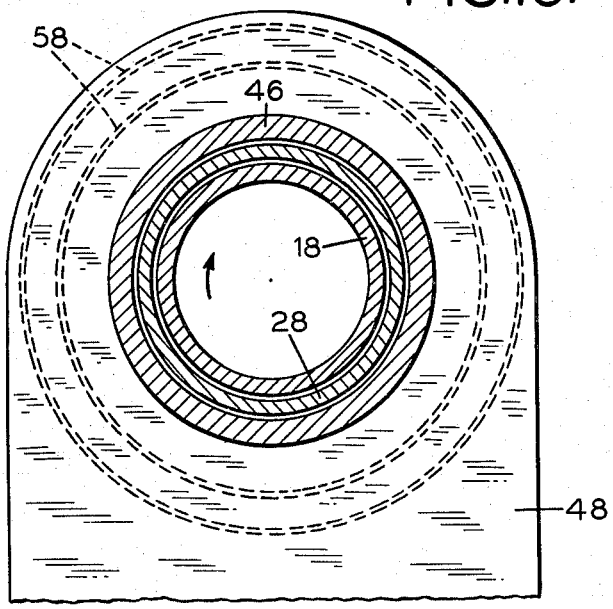
Figure 11:
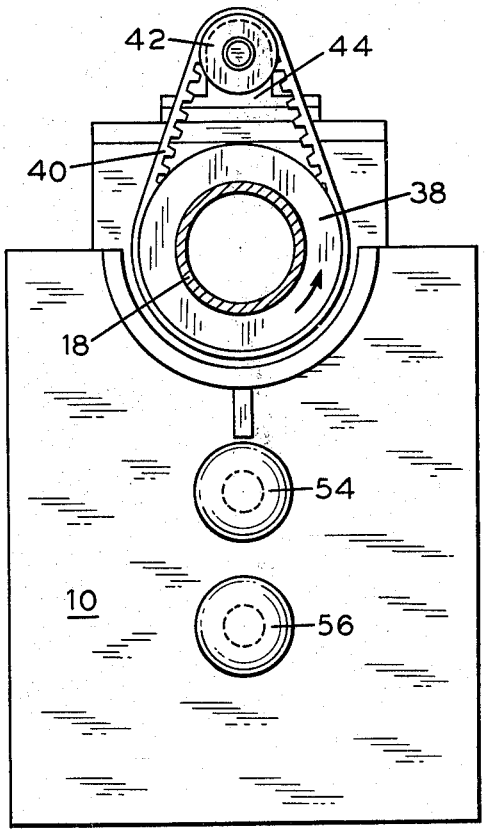
Figure 12:
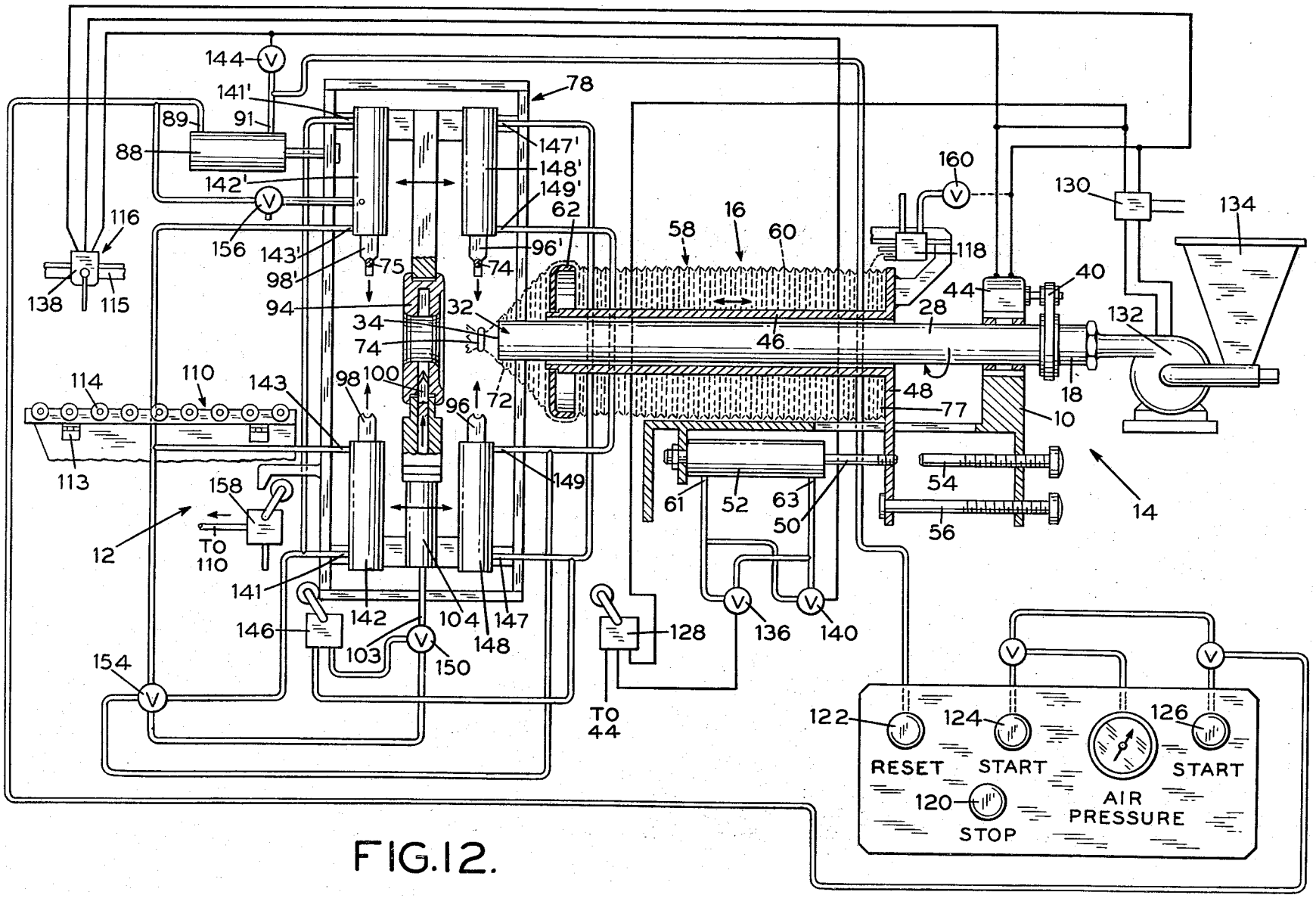
Figure 13:
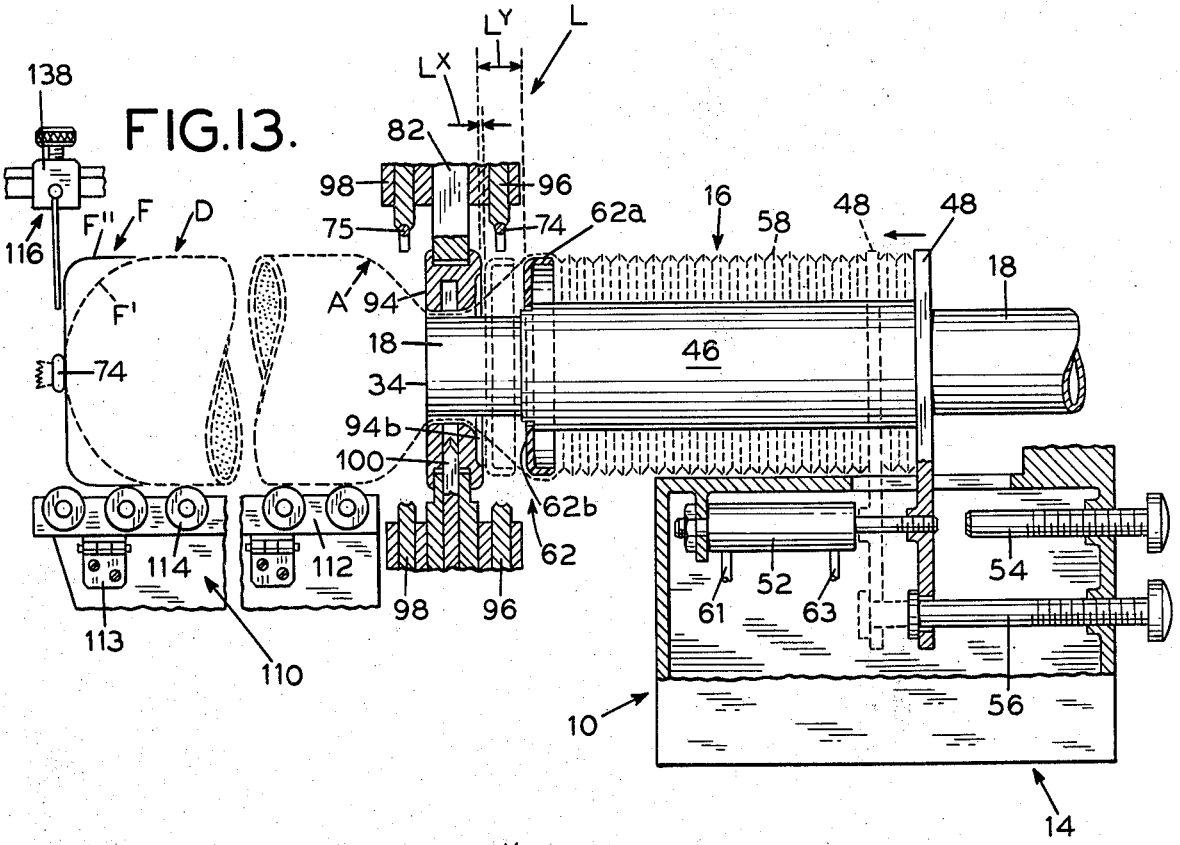
Figure 14:
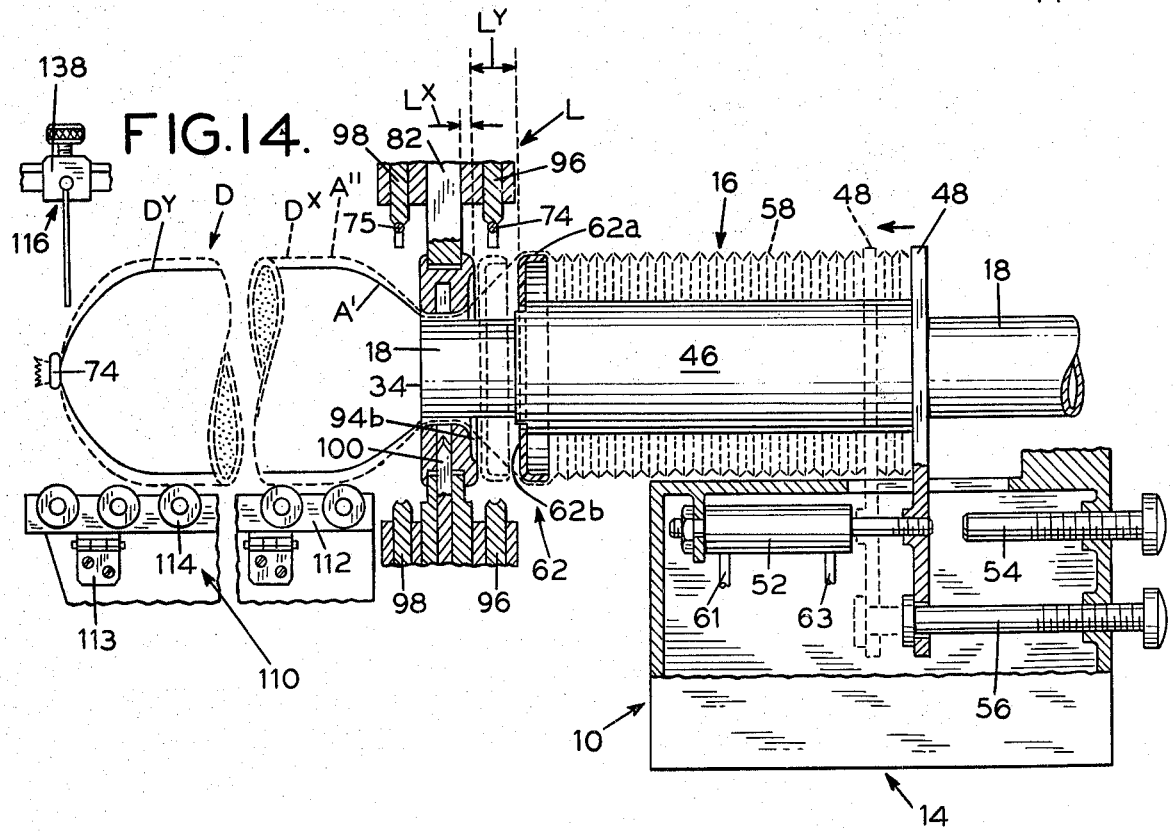
Figure 15:
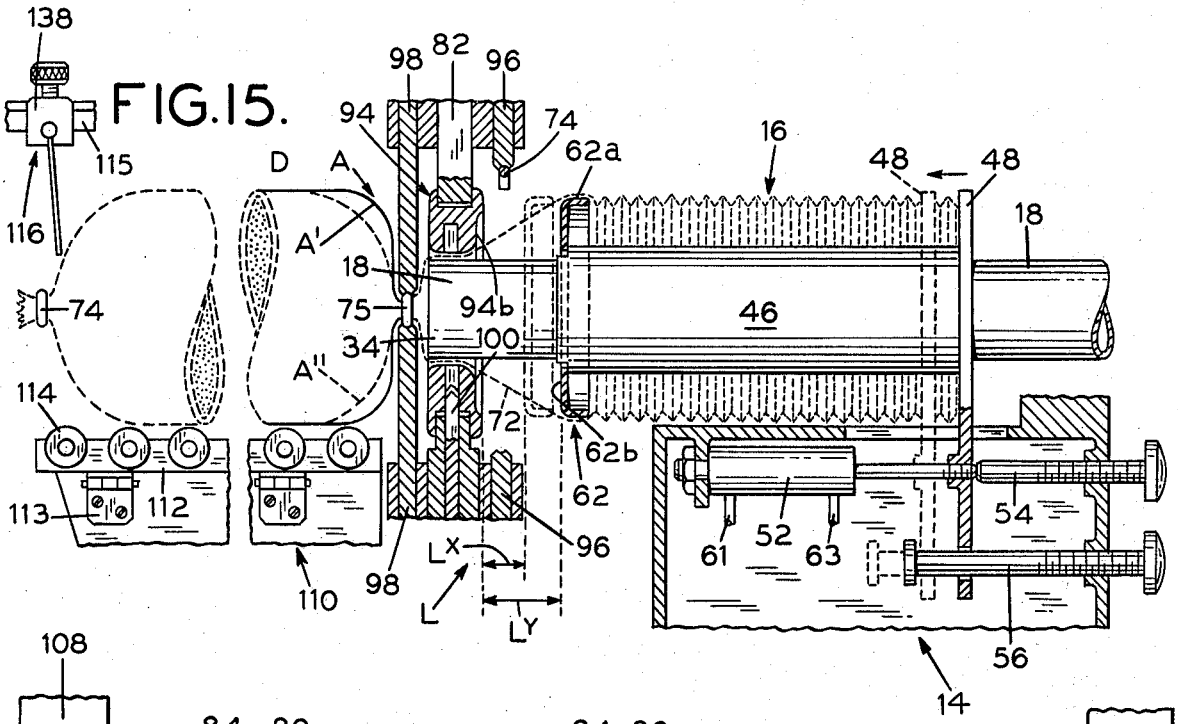
Figure 16:
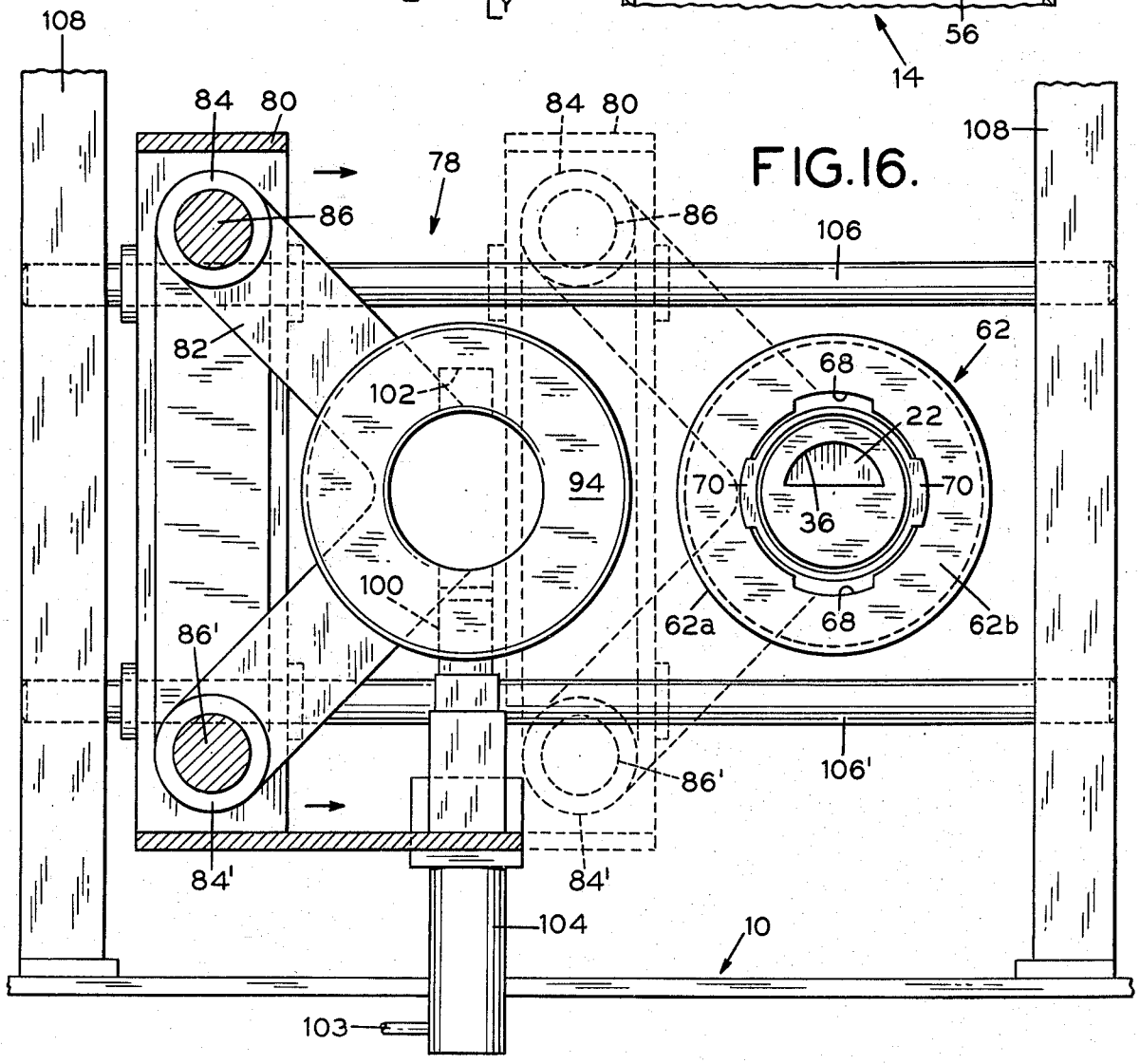

FIG. 3 is an exploded perspective view of portions of the apparatus of FIG. 1 showing portions of the product conveyor, snubbing means and the stuffing horn assembly, having portions of the stuffing horn assembly broken away to show the support sleeve, central support tube and emulsion cut-off tube, with the sizing disc secured to the support sleeve and showing the annular ring forming part of a snubbing carriage in phantom, retracted from and laterally displaced from the central support tube axis;

FIG. 4 shows the fore portion of the apparatus of FIG. 1 with similar parts identified with the same reference numbers showing the snubbing carriage axially aligned with and advanced over the discharge end of the central support tube, and the step of stuffing the casing substantially completed;

FIG. 5 shows the fore portion of the apparatus of FIG. 1 with similar parts identified with the same reference numbers showing the just stuffed casing advanced forward of the central support tube, and clip closure means applying a clip to the trailing end of the just filled casing;

FIG. 6 shows the fore portion of the apparatus of FIG. 1 with similar parts identified with the same reference numbers showing the clip closed stuffed casing length further advanced forward, the snubbing carriage being retracted from the stuffing horn assembly, a clip closure means having applied a clip to the leading end of the succeeding casing, and severing means effecting a cutting of the casing between the trailing and leading end clips;

FIG. 7 is a vertical sectional view taken along the line 7—7 of FIG. 1 enlarged to show the emulsion cutoff means and the leading end of the deshirred casing;

FIG. 8 is a vertical sectional view taken along the line 8—8 of FIG. 1 enlarged to show the casing sizing disc secured on the support sleeve coaxially journaled on the emulsion cut-off tube and the central support tube;

FIG. 9 is a side elevation partly in section of the apparatus components shown in FIG. 8;

FIG. 10 is a vertical sectional view taken along the line 10—10 of FIG. 1 enlarged to show the coaxially journaled tubes, support sleeve and sleeve mounting plate;

FIG. 11 is a vertical sectional view taken along the line 11—11 of FIG. 1 showing the means for actuating the emulsion cut-off tube;

FIG. 12 is a schematic representation of one embodiment of a control system of the invention for sequentially operating the stuffing, clipping, and severing elements of the apparatus shown in FIGS. 1 and 3 to 11;

FIG. 13 is a schematic representation of portions of the apparatus showing modes of operation for controlling the shape of the leading end of the stuffed product;

FIG. 14 is a schematic representation of the apparatus showing modes of operation for controlling the size of the stuffed product;

FIG. 15 is a schematic representation of the apparatus showing modes of operation for controlling the shape of the trailing end of the stuffed product; and FIG. 16 is a vertical section taken generally along line 16—16 of FIG. 1 showing the subframe and operating elements mounted thereon.

In accordance with the present invention, there is provided an apparatus for controlling the uniformity of stuffed diameter and conformation of the terminal ends of an encased product comprising in combination, a frame; a stuffing horn assembly including a central support tube having an inlet end and a discharge end for conveying emulsion from a supply source, an emulsion cut-off tube and a sleeve means movably mounted with respect to said support tube and adapted to mount and secure a shirred tubular casing on said sleeve means, and emulsion cut-off means disposed at the discharge end of said support tube to control the flow of emulsion into a mounted casing; snubbing means associated with said stuffing horn assembly and adapted to be partially advanced over and retracted from said emulsion cutoff tube and further adapted to provide a closure means adapted for enclosing an enclosed product after a predetermined stuffing length; motive means to operate said sleeve means and snubbing means to regulate the position of said snubbing means over said emulsion cut-off tube and the position of said sleeve means relative to said snubbing means; and control means operatively associated with said stuffing horn assembly and said snubbing means to selectively control a cycle of successive stuffing and closing operations, thereby producing a stuffed closed encased product of predetermined length and diameter with controlled shape of the leading and trailing ends of said product.

The present invention also provides a method for controlling the uniformity of stuffed diameter and conformation of the terminal ends of an encased product which comprises:

a. positioning a closed end shirred tubular casing article containing a sizing means and having a leading end unshirred portion of casing length secured by a closure, onto a movably mounted supportsleeve of a stuffing horn assembly;

b. moving said support sleeve and sizing means to deshirr a predetermined length of casing at the beginning of a first cycle and for successive cycles;

c. introducing a pressurized emulsion through a central support tube into said deshirred portion of shirred tubular casing article;

d. providing and regulating a time interval for returning said sizing means and deshirred casing length to impose a predetermined tension on said casing length to provide a controlled shape leading end of said encased product;

e. continuing the stuffing of said casing with emulsion after formation of said shaped leading end by continually feeding emulsion into said casing while regulating the diameter by passing the casing length over said sizing means and through an annular ring to provide a snubbing force;

f. controlling the shape of the trailing end of the stuffed encased product by providing and regulating a time interval for advancing and retracting said sizing means to deshirr a predetermined length of casing and impose a predetermined sizing tension on said casing length to provide a controlled shaped trailing end of said product;

g. gathering said trailing end and applying a trailing end closure thereto;

h. advancing the stuffed encased product and applying a leading end closure to a succeeding casing length adjacent said trailing end closure; and thereafter, i. severing the stuffed closed product from the succeeding casing length and doffing the product from a product conveyor.

In general, the apparatus of the invention employs a stuffing horn assembly which includes a central support tube adapted for ready connection to a supply of pressurized food emulsion such as a meat emulsion, typically utilizing a conventional supply hopper and pump system. The central support tube of the horn assembly has an inlet end and a discharge end and serves as a conduit to convey the food emulsion from a supply source connected at its inlet end to its discharge end. The stuffing horn assembly also includes emulsion cut-off means disposed at the discharge end of the central support tube to control the flow of emulsion into the casing to be stuffed. The cut-off means employs a cut-off tube journaled on the central support tube. A support sleeve is journaled on the cut-off tube, and provides means adapted to mount and detachably secure thereto the sizing means implanted in the preshirred tubular casing. The support sleeve is adapted to be reciprocated to and fro to thereby manipulate the secured sizing means to predetermined fore and aft positions while supporting the shirred tubular casing thereon.

The apparatus also employs a snubbing means including a snubbing carriage adapted to be axially aligned with the central support tube of the stuffing horn assembly and mounting an annular snubbing ring adapted to be advanced over and retracted therefrom. The snubbing carriage also mounts a pair of conventional clip closing means and a severing means. In its retracted position, distally spaced from the stuffing horn assembly, the snubbing carriage is also adapted to be moved transversely from and to the axis of the central support tube to permit loading and securing the prepacked shirred casing article onto the sleeve means.

Motive means are employed to operate the sleeve means and the snubbing means to regulate the position of the snubbing means over the emulsion cut-off tube and the position of the sleeve means relative to the snubbing means.

Appropriate pneumatic or electro/pneumatic control means can be employed to operate the sleeve means, the emulsion cut-off means ensleeved on the central support tube of the stuffing horn assembly, and other elements of the snubbing carriage in combination, to selectively control a cycle of successive stuffing, clipping and severing operations and thereby produce a stuffed clip closed food product having a predetermined length and diameter, and having controlled shapes of the leading end and trailing end portions of the product.

In FIG. 1 there is shown a stuffing apparatus wherein reference numeral 10 generally represents a frame which is capable of accommodating the various components of the apparatus. The frame provides an aft end 14 which supports components of the apparatus closest to the supply of food product hereinafter called emulsion, and a fore end 12 which accommodates the components of the apparatus servicing the tubular casing during stuffing. Demountably secured to the frame 10 towards its aft end 14 is a stuffing horn assembly 16 which includes a central support tube 18 of generally cylindrical configuration and which extends longitudinally from the aft end 14 of the frame towards the fore end 12. The central support tube 18 has an inlet end 20 disposed at the aft end 14 of the frame 10 which is detachably secured to a source of pressurized emulsion (as shown in FIG. 12) and is further provided with a tapered plug 22 which is adapted to streamline the emulsion directed through support tube 18 to discharge port 24. The central support tube is demountably secured onto shouldered boss 26 of frame 10 near its inlet end 20.

As best seen in FIGS. 1 and 7 the discharge port 24 of central support tube 18 is of generally semicircular configuration as formed by tapered plug 22, and cooperates with emulsion cut-off means (in a manner as explained hereafter) to control the passage of emulsion through the discharge port 24.

The stuffing horn assembly 16 also includes emulsion cut-off tube 28 which is concentrically disposed and rotatably trunnioned on central support tube 18 at the end adjacent discharge port 24 and at the other end in bushings 30 of boss 26. Thus, as so constructed and arranged, emulsion cut-off tube 28 is adapted to rotate about the longitudinal axis of central support tube 18, the latter remaining in fixed relation with respect to frame 10.

Situated adjacent the discharge port 24 of central support tube 18 is the outlet end 32 of emulsion cut-off tube 28. As best seen in FIGS. 1, 3 and 7, the outlet end 32 has an end wall 34 which is provided with a semicircular cut-off orifice 36 adapted to be in registering alignment with discharge port 24 of central support tube 18 upon appropriate rotation of the emulsion cut-off tube 28.

In operating position, emulsion cut-off tube 28 is disposed in a manner such that discharge port 24 is in registering alignment with cut-off orifice 36 thereby permitting pressurized emulsion to pass therethrough. In non-operating or closed position, emulsion cut-off tube 28 has been rotated through 180° and in this position, cut-off orifice 36 is in alignment with tapered plug 22, and discharge port 24 is adjacent end wall 34 of emulsion cut-off tube 28 preventing further flow of emulsion.

The appropriate rotation of emulsion cut-off tube 28 is effected by a pneumatic motor and pulley means through control means later described. Referring particularly to FIGS. 1 and 11, the end of emulsion cut-off tube 28 facing the aft end 14 of the frame 10 has pulley 38 secured thereto and is coupled by timing belt 40 to pulley 42 driven by a pneumatic motor 44 which rotates emulsion cut-off tube 28 to the operating or non-operating positions.

The stuffing horn assembly 16 also includes a support sleeve 46 generally shown in FIGS. 1, 3 and 10 which is slidably journaled on emulsion cut-off tube 28. The support sleeve is capable of limited, controlled movement either towards or away from the aft end of the apparatus.

Thus, the aft end of support sleeve 46 terminates in mounting plate 48 as shown in FIGS. 1 and 10, which is secured to rod 50 of pneumatic cylinder 52 mounted on frame 10. As best seen in FIG. 1 fore and aft movement of the support sleeve 46 is effected by pneumatic cylinder 52 and is limited by aft end adjustable stop 54 and fore end adjustable stop 56.

Figure 2:
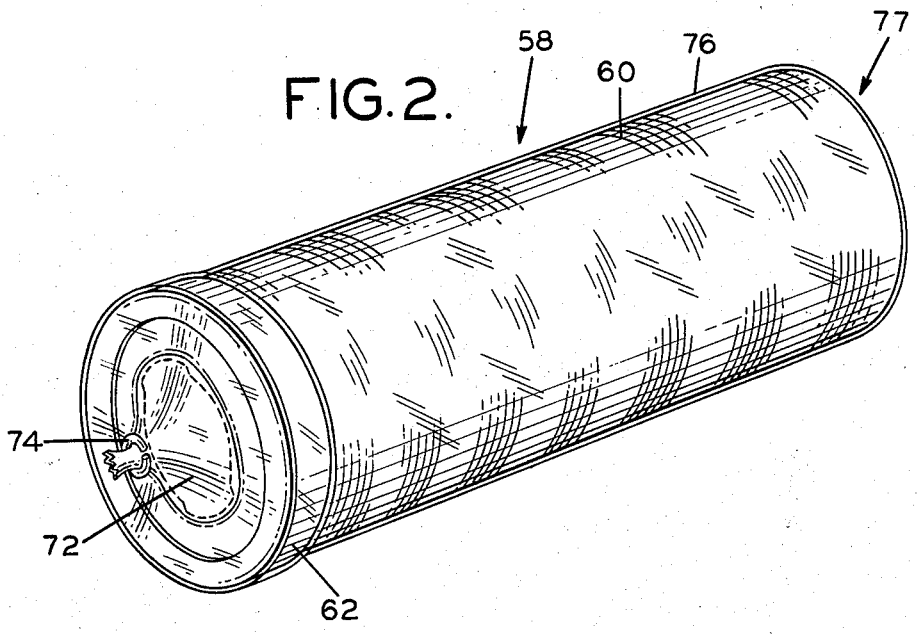
FIG. 2 is a perspective illustrating the prepackaged shirring casing article used on the apparatus of the invention.

The support sleeve 46 is adapted to accommodate and detachably secure a shirred tubular casing article having a casing diameter sizing means confined within a deshirred or unshirred portion of the tubular casing. The shirred tubular casing article for use in the present invention is depicted in FIG. 2 of the drawing and is disclosed in the copending application of John H. Beckman, Ser. No. 627,253, having a common assignee and which was filed concurrently herewith, the disclosure of which is incorporated herein by reference. In general, however, and referring again to FIG. 2, the shirred tubular casing article 58 includes a shirred casing length 60 such as a 150 foot length of Union Carbide Corporation's No. 6 fibrous casing compacted to a length of about 2 feet. The materials from which the casing lengths are manufactured can typically be films fabricated from unsupported or fibrous reinforced cellulose, polyvinylidene chloride, polyvinylchloride, polyesters, collagen, and polyolefins such as polyethylene or any other suitable material.

As mentioned previously, the casing length can be shirred with the apparatus and process disclosed in U.S. Pat. Nos. 2,983,949 and 2,984,574 to Matecki with compression ratios of about 40:1 and up to 100:1.

The shirred tubular casing article 58 also includes a sizing disc 62 of generally annular configuration and which is provided with a central opening defining an inner diameter of the sizing disc 62 which is slightly larger than the diameter of shoulder 66 at the fore end of support sleeve 46 (FIGS. 3, 8 and 9). The sizing disc 62 can be fabricated from any material capable of withstanding the stresses imposed upon it during operation. Merely as illustrative, the sizing disc 62 can be fabricated from a metal such as stainless steel or a plastic such as polyethylene, nylon, polytetrafluoroethylene, and like materials.

The sizing disc 62 is provided with slot elements which coact with mating locking elements on support sleeve 46 to lock or secure the shirred tubular casing article 58 to the support sleeve 46. One form of locking means is shown in FIGS. 3, 8 and 9 and includes a disc aperture 64 (FIG. 8) having a slide fit for shoulder 66 disposed at the fore end of support sleeve 46. Disc aperture 64 is provided with disc aperture recesses 68 which are adapted to be mated with retaining shoulder or lug elements 70 fixedly mounted on support sleeve 46. Thus by urging disc aperture recesses 68 into mating relationship with retaining shoulder portions 70 and thereafter twisting the sizing disc 62; a bayonet or twist type locking or securing means is provided thereby securing the shirred tubular casing article 58 to the support sleeve 46.

As shown in FIG. 2, the shirred tubular casing article 58 also includes a deshirred or unshirred portion 72 of casing length 60 which envelopes the sizing disc 62 and is clip closed with a leading end metal clip 74. The shirred tubular casing article 58 also includes a film overwrap 76, preferably of a flexible synthetic polymeric material which protects and retains the shirred casing length 60 during shipment and the securing of it onto support sleeve 46. The shirred tubular casing article 58 can be mounted on support sleeve 45 by inserting the open end 77 of shirred tubular casing article (shown in FIG. 1) over the support sleeve 46 and securing the sizing disc thereto as explained previously. The film overwrap 76 can then be removed for stuffing the casing length.

Associated with the stuffing horn assembly is a snubbing carriage 78 which is cyclically adapted to be advanced toward and retracted from the stuffing horn assembly 16. The snubbing carriage 78 provides elements which function to clip and sever the finished article and further provides restraining means in combination with sizing disc 62 for snubbing and thereby restraining the deshirred casing length during the filling operation.

Referring to FIGS. 1 and 16, the snubbing carriage 78 is shown slideably mounted on subframe 80 and is capable of longitudinal and transverse directional movement with respect to the stuffing horn assembly 16. Longitudinal or fore and aft end directional movement of snubbing carriage 78 can be provided by means of strut 82 projecting from slide bearings 84, 84' which are integrally associated with snubbing carriage 78 and which are slidably mounted on slide rods 86, 86'. Pneumatic cylinder 88 accommodates a piston rod 90 one end of which is secured to strut extension 92 of strut 82. Activation of pneumatic cylinder 88 causes either fore or aft end movement of piston rod 90 thereby providing fore or aft end movement of snubbing carriage 78 which further permits the functions of the remaining snubbing carriage closure elements to be sequentially performed. Thus as best seen from FIGS. 1, 3, 4 and 5 snubbing carriage 78 mounts an annular ring 94 which defines a central opening having an inner circumference slightly larger than the circumference of the fore end of emulsion cut-off tube 28.

Mounted on strut 82, athwart annular ring 94 is a pair of pneumatically operated conventional casings gathering and clip closing devices i.e., a leading end clip closing device 96 and a trailing end clip closing device 98. A severing knife 100, for severing the clip closed product is adapted to be advanced into slot 102 of annular ring 94. Movement of severing knife 100 is sequentially timed by means of control elements activating pneumatic cylinder 104 to which the severing knife 100 is connected.

As will be evident from the foregoing description, activation of pneumatic cylinder 88 advances or retracts carriage 78 and with it annular ring 94 and clipping elements 96, 98 and severing means 100. Thus annular ring 94 can be advanced coaxially over stuffing horn assembly 16 or retracted distally therefrom.

Lateral movement of snubbing carriage 78 slideably mounted on subframe 80 can be accomplished when retracted distally from horn assembly 16. As best seen in FIG. 16, subframe 80 is manually laterally movable on slide rods 106, 106' secured at each end to frame members 108 having end portions secured to frame 10.

After completely stuffing a shirred casing, the used sizing disc 62 can be removed and a new shirred tubular casing article 58 can be inserted onto the support sleeve 46 by laterally retracting the snubbing carriage 78 from the axis of stuffing horn assembly 16 thereby permitting positioning and securing a new sizing disc 62 in the casing article onto sleeve 46. Snubbing carriage 78 is then advanced on subframe 80 to the axis of stuffing horn assembly in preparation for the automatic stuffing operation as shown in FIGS. 1 and 3.

Referring again to FIG. 1, situated at the fore end of frame 10 is a pivoted product conveyor 110 which supports the stuffed casing as it is progressively filled with food emulsion and advanced from the discharge port 24 of central support tube 18. The product conveyor 110 includes a frame 112 having a plurality of transverse rollers 114 spaced longitudinally and arranged to roller support the stuffed casing. Frame 112 is pivotally fastened to frame 10 by hinges 113. A product stop 116 is adjustably fastened to slide angle 115 secured to frame 10 and is adapted to sense the fore end of a stuffed product to terminate a stuffing operation as will be described below.

In addition, a casing tab gripper 118 is fastened to plate 48 of support sleeve 46 and is positioned to releasably grip a portion of the shirred tubular casing article 58, such that before the shirred tubular casing length 60 has been entirely depleted, signal means anticipates and interrupts the automatic stuffing cycle of the apparatus.

The control circuitry for operating the apparatus of the invention, as shown schematically in FIG. 12, principally employs conventional pneumatic components desirable for safety in cleaning and sanitizing operations required by Governmental Regulations prescribed for food machinery. Equivalent control components can be alternatively employed, as is well known to those skilled in the art.

The operation of the illustrated apparatus according to the invention, after loading the shirred tubular casing article thereon, is shown sequentially in the drawing, FIGS. 1, 4, 5 and 6.

The loading and preparation mode includes priming the central support tube 18 with emulsion; loading the shirred tubular casing article 58 on the support sleeve 46; gathering and clipping the casing after interruption of an automatic stuffing operation; making any indicated minor adjustment of product size diameter; and adjusting to shape the fore and aft end configurations of the stuffed product.

The pneumatic control components for cyclically sequencing the apparatus components to operate the stuffing, closing and severing functions of the invention are shown schematically in FIG. 12.

These components employ combinations of conventional pneumatically operated transducers, combination of valves, and fittings, known to those skilled in the art. Typical pneumatic components shown and operatively described below, are manually actuated valves 120, 122, 124, 126; mechanically actuated limit switch valves 118, 128, 138, 146, 156, 158; pilot operated control valves with time delay 136, 140, 144, 150, 154, 160; pressure controlled electrical switch 130, and other conventional pneumatic components and fittings. They are interconnected to a regulated supply of pressurized air (not shown).

Referring specifically to FIG. 12, in order to manually load the apparatus of the invention with the prepackaged shirring tubular casing article 58, snubbing carriage 78 is automatically retracted axially distally from stuffing horn assembly 16 by momentarily depressing stop button 120 and reset button 122 to pressurize conduit 91 at the rod end of cylinder 88. Subframe 80 (FIG. 1) of carriage 78 is then manually laterally retracted from the axis of central support tube 18. The open end 77 of article 58 is placed onto support sleeve 46 and a short length portion or tab end of casing is deshirred and clamped into casing tab gripper 118. The sizing disc 62 (FIGS. 8, 9) is fitted onto shoulder 66 of sleeve 46 and is twist locked thereon by retaining shoulder lugs 70, to snug the casing's clip closed end up to outlet end 32 as shown in FIG. 1. Subframe 80 is then manually returned to the axis of central support tube 18 and the clip closed shirred casing is now in condition for starting the automatic stuffing operation.

Again referring to FIG. 12, the automatic stuffing operation is begun by depressing the two spaced start buttons 124 and 126, to thereby pressurize conduit 89 at the head end of carriage cylinder 88 thereby advancing snubbing carriage 78 to the stuffing station shown in FIG. 4. When snubbing carriage 78 is advanced to the stuffing station, emulsion interlock valve 128 is contacted and energized to provide a control signal initiating four concurrently coordinated functions, (1) pressure sensitive electrical switch 130 is closed, thereby energizing the emulsion pump 132 connected to emulsion supply hopper 134; (2) pneumatic motor 44 rotates emulsion cut-off tube 28 to align cut-off orifice 36 (FIGS. 3 and 7) with discharge port 24 and thereby allows pressurized emulsion to stuff deshirred portion of casing length 72 during the stuffing phase of the cycle which immediately follows; (3) conduit 61 of pneumatic cylinder 52 pressurizes its head end thereby retracting support sleeve 46 and sizing disc 62, thus deshirring a predetermined length of casing for the beginning of the cycle; (4) the time delay valve 136 is started to provide a time interval prior to reversing the pressure on pneumatic cylinder 52 through conduit 63 to advance sizing disc 62 and thereby to release the deshirred casing length from tension between the disc 62 and the tube end wall 34 and thereby provide a controlled shape leading end.

The length of casing deshirred thusly at the beginning of the stuffing cycle is predetermined by the setting of adjustable stop 54 adapted to arrest the retraction of support sleeve 46. When adjustable stop 54 is adjusted to provide a relatively long length and the time delay is adjusted to a short interval, a slack stuffed leading end configuration results as shown on FIG. 13 (dash line F'). If a tightly stuffed leading end configuration is desired (FIG. 13 solid line F") adjustable stop 54 is adjusted to provide a relatively short length of deshirred casing and valve 136 is adjusted for relatively short time interval. Various combinations of time interval and stroke length can be employed to product various degrees of stuffing and configuration of the casing leading end F.

As the emulsion under pressure thereafter shapes the leading end F it continues to fill the casing length and withdraw the casing length over the sizing surface 62a of sizing disc 62. Referring to FIG. 14 pneumatic cylinder 52 has advanced disc 62 mounted on support sleeve 46, to the variable stuffing position determined by adjustable stop 56, which controls the distance L between the face 62b of sizing disc 62 and the contoured face 94b (FIG. 1) of annular ring 94. A combination of the adjustable distance L and the predetermined diameter of sizing disc surface 62a controls the snubbing or braking force on the casing length as it is advanced and stretched over sizing disc surface 62a and then infolded through annular ring 94. The sizing disc provides primary control of stuffed diameter by stretching and sizing the casing length and uniformly stuffing the casing from end to end. Control of distance L provides a vernier or fine adjustment of diameter when necessary. When the distance L is short as shown on FIG. 14 as $L^x$, the casing is tightly snubbed and abruptly infolded between disc 62 and annular ring 94 thereby providing a uniform diameter $D^x$ (dash line, FIG. 14) slightly larger than the casing manufacturer's recommended nominal stuffing diameter. When the distance L is long as shown on FIG. 14 as $L^y$, the casing is less tightly snubbed and more gradually infolded as it passes over sizing disc 62 and through annular ring 94 thereby providing a uniform diameter $D^y$ (solid line, FIG. 14). This diameter in the extreme vernier setting may be slightly less than the casing manufacturer's recommended stuffing diameter.

The leading end of the stuffed product has now been selectively formed and the diameter D controlled as described above. The stuffed product has now reached the desired length and tripped a product length control valve 138 adjustably secured on slide angle 115 secured to frame 10 (FIG. 12). This initiates four simultaneous coordinated operations, (1) pressure sensitive electrical switch 130 is opened thereby deenergizing the emulsion pump 132 to terminate the flow of emulsion to central support tube 18; (2) pneumatic motor 44 is actuated to rotate emulsion cut-off tube 28 to close discharge end 24 as explained previously, and thereby terminate flow of emulsion into the casing length; (3) conduit 61 of pneumatic cylinder 52 pressurizes its head end, thereby retracting support sleeve 46 and sizing disc 62 thus deshirring a predetermined length of casing and transferring it to the force end portion 72 (FIG. 15); (4) the time delay valve 140 is started to provide a time interval prior to reversing the pressure on pneumatic cylinder 52 through conduit 63 to advance the sizing disc 62 thereby releasing the deshirred casing length from tension between the disc 62 and tube end wall 34 and thereby providing a controlled shape trailing end. The length of casing deshirred is predetermined by a setting of adjustable stop 54 adapted to arrest the retraction of support sleeve 46. The length of the stroke of pneumatic cylinder 52 which is activated during closure of the trailing end of the casing length, is equal to the stroke during formation of the leading end of the stuffed product, because the same adjustable stop 54 is used, and no adjustment is usually made in the intervening time interval.

As described above, time delay valve 140, starts a predetermined timing interval when product length control valve 138 is tripped, and controls the time the piston rod 50 of pneumatic cylinder 52 and sleeve 46 remain in the retracted position. At the termination of this time interval, the pressure on pneumatic cylinder 52 is reversed through conduit 63 to advance sleeve 46 mounting the sizing disc 62, then the trailing clipper cylinder 142 is pressurized to gather the trailing end of the casing and thereby apply trailing end clip 75 (FIG. 15). When the time delay valve 140 is adjusted to a relatively short time interval, and adjustable stop 54 is adjusted to provide a relatively short stroke, a tight trailing end A results as shown on FIG. 15 (solid line A'). When time delay valve 140 is adjusted to a relatively short time interval, and adjustable stop 54 is adjusted to a relatively long stroke, a slack stuffed trailing end results as shown on FIG. 15 (dash line A''). Various combinations of time interval and stroke length can be employed to produce various degrees of stuffing and configuration of the casing trailing end.

When the time interval of valve 140 terminates, it initiates another time delay valve 144, which delays the pressurizing of the rod end of pneumatic cylinder 88 through conduit 91 until the trailing end clipping operation has been completed. The pressure on pneumatic cylinder 88 is thereafter reversed retracting snubbing carriage 78 to the leading end clip position, concurrently deshirring an additional portion of casing length over sizing disc 62. When snubbing carriage 78 reaches the limit of pneumatic cylinder 88 stroke, it trips limit valve 146 which pressurizes conduit 147 and leading end cylinder 148, to gather the leading end of the next casing length and apply a leading end clip 74. Limit valve 146 is connected with and concurrently starts another time delay valve 150. After a predetermined time delay conduit 103 pressurizes knife cylinder 104, to advance severing knife 100 and sever the casing between clips 74, 75 (FIG. 6). When the time delay interval of valve 150 terminates, another time delay valve 154 is initiated to provide a time interval delaying the reversal of air pressure in cylinders 148, 142 and 104 until the severing operation is completed, whereupon the air pressure is reversed to retract the piston rods of trailing end clip cylinder 142, leading end clip cylinder 148 and knife cylinder 104. When the piston rod of cylinder 142 is retracted it opens limit valve 156 which pressurizes the pneumatic cylinder 88 advancing snubbing carriage 78 to the stuffing station, to repeat the stuffing cycle described above. When the snubbing carriage 78 is advanced to the stuffing station, it causes interlock valve 158 to be opened thus pressurizing a cylinder (not shown) connected to frame 112, to tilt conveyor 110 about hinges 113 and thereby remove the stuffed product from the rollers 114 of product conveyor 110. Removal of the stuffed product permits resetting of product length control valve 138 to sense the length of the next stuffed product.

When the shirred casing length 60 on support sleeve 46 becomes depleted it trips the casing tap gripper 118 which starts time delay valve 160 to provide a time interval predetermined to be somewhat less than the time needed to stuff the casing remaining on the horn assembly whereupon it acts to stop the flow of emulsion and apply the trailing end clip 75. The casing tab gripper utilized as a sensor is the subject of copending application Ser. No. 627,254 filed concurrently herewith and assigned to a common assignee. The details of construction and operation of the sensor are disclosed in said application and are incorporated herein by reference. The depleted article comprising the remaining unused casing length, sleeve overwrap and sizing disc 62, is removed from the support sleeve 46, and the next packaged tubular casing article 58 is then loaded on the apparatus as described above in order to continue subsequent stuffing operations.

As mentioned previously, the apparatus of this invention is made to function with a prepackaged shirred casing article. The dimensions and shape of the confined or implanted sizing disc in each such shirred casing article is predetermined by the casing manufacturer for each diameter of casing sold for the stuffing system of this invention. Thus the casing sizing disc implanted in each prepackaged shirred casing article, in combination with a snubbing or restraining means, provides means to control and limit the range allowable for stuffing the casing over or under a recommended predetermined diameter. Advantageously, an operator can thus stuff successive lengths of the same size casing to such predetermined diameter without modifying or adjusting the machine. The apparatus can also accommodate mixed size prepackaged shirred lengths successively at the will of the operator (when loading a new casing), since each prepackaged casing length is provided with an implanted sizing disc having optimum dimensions determined by the casing manufacturer. The apparatus is adapted to handle a range of mixed casing sizes such as from 101 mm. to 129 mm. stuffed diameter without changing apparatus components. Wider ranges can be handled by changing the stuffing horn assembly 16 and the matching annular snubbing ring 94.

Thus the apparatus of the invention can be readily adjusted to provide a uniformly stuffed food casing with accurate control of diameter, and of shape and tightness of stuffing of the leading end and the trailing end of the sausage product. Alternatively, the apparatus can be programmed to produce a strand of interconnected sausage links having selectively either a single clip closure or spaced double clip closures intermediate the links.

Operation and control of the apparatus described above has principally employed pneumatic motive means. Alternative electro-pneumatic means can be employed. Typically, a plurality of motor driven cam operated timing switches can be used to control the sequential operations of stuffing, closing and severing of the casing.

A first cam operated timing switch can be used to generally control the stuffing formation of the fore end of the product. A second timing switch can be used to generally control the stuffing formation of the aft end of the product. A third cam operated timing switch can be used to generally control the snubbing carriage motion, clipping and severing means. A fourth timing switch can be used to control termination of the stuffing operation upon a signal from the casing trailing end sensor.

Although the apparatus has been described with reference to filled sausage casings, it is to be understood that the invention is not limited to such stuffed products, but is equally advantageous for the encasing of stuffed products of viscous material, such as fats, cheese, ice cream, scrapple, ground fresh meat products, as well as lard, oleomargarine, and other products normally stuffed into casings. Alternative embodiments and modes of practicing the invention, but within its spirit and scope, will, in the light of this disclosure, occur to persons skilled in the art. It is intended, therefore, that this description be taken as illustrative only and not be construed in any limiting sense.

What is claimed is:

1. An apparatus for controlling the uniformity of stuffed diameter and conformation of the terminal ends of an encased product comprising in combination, a frame; a stuffing horn assembly including a central support tube having an inlet end and a discharge end for conveying emulsion from a supply source, an emulsion cut-off tube rotatably mounted with respect to said support tube and a sleeve means axially movably mounted with respect to said support tube and adapted to mount and secure a shirred tubular casing on said sleeve means, and emulsion cut-off means disposed at the discharge end of said support tube to control the flow of emulsion into a mounted casing; snubbing means associated with said stuffing horn assembly and adapted to be partially advanced over and retracted from said emulsion cut-off tube and further adapted to provide a closure means adapted for enclosing an encased product after a predetermined stuffing length; motive means to operate said sleeve means and snubbing means to regulate the position of said snubbing means over said emulsion cut-off tube and the position of said sleeve means relative to said snubbing means; and control means operatively associated with said stuffing horn assembly and said snubbing means to selectively control a cycle of successive stuffing and closing operations, thereby producing a stuffed closed encased product of predetermined length and diameter with controlled shape of the leading and trailing ends of said product.

2. Apparatus according to claim 1 wherein said central support tube is of generally cylindrical configuration and wherein said emulsion cut-off tube is concentrically disposed and rotatably trunnioned on said central support tube.

3. Apparatus according to claim 2 wherein said emulsion cut-off tube and said central support tube coact to provide said emulsion cut-off means to regulate flow of emulsion through said central support tube.

4. Apparatus according to claim 3 wherein said emulsion cut-off means includes a tapered plug disposed at said discharge end of said central support tube defining a discharge port on said support tube of generally semicircular configuration, and further includes an outlet end of said emulsion cut-off tube having an end wall defining a generally semicircular orifice, whereby when said discharge port is in registering alignment with said orifice, pressurized flow of emulsion can pass therethrough, and when said cut-off tube is rotated to align said discharge port with said end wall, said flow of emulsion is prevented from passing through said discharge port.

5. Apparatus according to claim 1 wherein said sleeve means includes a support sleeve slidably journaled on said emulsion cut-off tube.

6. Apparatus according to claim 5 wherein said support sleeve is capable of limited controlled movement along the longitudinal axis of said emulsion cut-off tube.

7. Apparatus according to claim 1 wherein said emulsion cut-off tube and said central support tube coact to provide said emulsion cut-off means to regulate flow of emulsion through said central support tube.

8. Apparatus according to claim 7 wherein said emulsion cut-off means includes means disposed at said discharge end of said central support tube defining a discharge port on said support tube, and further includes an outlet end of said emulsion cut-off tube having an end wall defining an orifice, whereby when said discharge port is in registering alignment with said orifice, pressurized flow of emulsion can pass therethrough, and when said cut-off tube is positioned to align said discharge port with said end wall, said flow of emulsion is prevented from passing through said discharge port.

9. Apparatus according to claim 1 wherein said snubbing means includes a snubbing carriage adapted to be axially aligned with said central support tube and adapted to be advanced and retracted longitudinally over one end of said emulsion cut-off tube, and includes a restraining means for restraining a deshirred portion of a mounted tubular casing during stuffing of said mounted casing.

10. Apparatus according to claim 9 wherein said restraining means comprises an annular snubbing ring.

11. Apparatus according to claim 9 wherein said snubbing carriage when retracted from said emulsion cut-off tube is adapted to be moved transversely from and to the longitudinal axis of said central support tube to permit mounting and securing a shirred tubular casing onto said sleeve means.

12. Apparatus according to claim 1 wherein said sleeve means contains locking elements which coact to provide locking means adapted to detachably secure a sizing means to said sleeve means, thereby providing means for mounting a shirred tubular casing on said sleeve means.

13. Apparatus according to claim 1 wherein said control means includes means for retracting said sleeve means distally from said snubbing means to deshirr a predetermined length of a mounted shirred tubular casing, and means for advancing said sleeve means after a predetermined time interval toward said snubbing means to regulate tension of said deshirred casing.

14. Apparatus according to claim 13 wherein said control means further includes means for varying said time interval and means for regulating the distance of advance and retraction of said sleeve means.

15. An apparatus for controlling the uniformity of stuffed diameter and conformation of the terminal ends of an encased product comprising in combination, a frame; a stuffing horn assembly including a central support tube having an inlet end and a discharge end for conveying emulsion from a supply source, an emulsion cut-off tube rotatably mounted with respect to said support tube and a sleeve means axially movably mounted with respect to said support tube, a casing sizing means confined within an unshirred portion of a closed end of a shirred tubular casing, said sizing means being detachably secured on said sleeve means to mount said casing thereon, and emulsion cut-off means disposed at the discharge end of said support tube to control the flow of emulsion into said casing; snubbing means associated with said stuffing horn assembly and adapted to be partially advanced over and retracted from said emulsion cut-off tube, and further adapted to provide a closure means adapted for enclosing an encased product after a predetermined stuffing length; motive means to operate same sleeve means and said snubbing means to regulate a restraining force on said unshirred portion of casing positioned on said sizing means by varying the clearance between said sizing means and said snubbing means; and control means operatively associated with said stuffing horn assembly and snubbing means to selectively control a cycle of successive stuffing and closing operations, thereby producing a stuffed closed encased product of determined length and diameter with controlled shape of the leading and trailing ends of said product.

16. Apparatus according to claim 15 wherein said central support tube is of generally cylindrical configuration and wherein said emulsion cut-off tube is concentrically disposed and rotatably trunnioned on said central support tube.

17. Apparatus according to claim 16 wherein said emulsion cut-off tube and said central support tube coact to provide said emulsion cut-off means to regulate flow of emulsion through said central support tube.

18. Apparatus according to claim 17 wherein said emulsion cut-off means includes a tapered plug disposed at said discharge end of said central support tube defining a discharge port on said support tube of generally semicircular configuration, and further includes an outlet end of said emulsion cut-off tube having an end wall defining a generally semicircular orifice, whereby when said discharge port is in registering alignment with said orifice, pressurized flow of emulsion can pass therethrough, and when said cut-off tube is rotated to align said discharge port with said end wall, said flow of emulsion is prevented from passing through said discharge port.

19. Apparatus according to claim 15 wherein said sleeve means includes a support sleeve slidably journaled on said emulsion cut-off tube.

20. Apparatus according to claim 19 wherein said support sleeve is capable of limited controlled movement along the longitudinal axis of said emulsion cut-off tube.

21. Apparatus according to claim 15 wherein said emulsion cut-off tube and said central support tube coact to provide said emulsion cut-off means to regulate flow of emulsion through said central support tube.

22. Apparatus according to claim 21 wherein said emulsion cut-off means includes means disposed at said discharge end of said central support tube defining a discharge port on said support tube, and further includes an outlet end of said emulsion cut-off tube having an end wall defining an orifice, whereby when said discharge port is in registering alignment with said orifice, pressurized flow of emulsion can pass therethrough, and when said cut-off tube is positioned to align said discharge port with said end wall, said flow of emulsion is prevented from passing through said discharge port.

23. Apparatus according to claim 15 wherein said snubbing means includes a snubbing carriage adapted to be axially aligned with said central support tube and adapted to be advanced and retracted longitudinally over one end of said emulsion cut-off tube, and includes a restraining means for restraining said deshirred portion of said tubular casing during stuffing of said tubular casing.

24. Apparatus according to claim 23 wherein said restraining means comprises an annular snubbing ring.

25. Apparatus according to claim 23 wherein said snubbing carriage when retracted from said emulsion cut-off tube is adapted to be moved transversely from and to the longitudinal axis of said central support tube to permit mounting and securing said shirred tubular casing onto said sleeve means.

26. Apparatus according to claim 15 wherein said sizing means and sleeve means contain locking elements which coact to provide locking means adapted to detachably secure said sizing means to said sleeve means.

27. Apparatus according to claim 26 wherein said sleeve means includes a support sleeve having retaining elements, and wherein said sizing means comprises a sizing disc and said disc includes a disc aperture containing disc aperture recesses, whereby urging of said disc aperture recesses into mating relationship with said retaining elements and thereafter twisting said sizing disc provides locking means securing said disc to said support sleeve.

28. Apparatus according to claim 15 wherein said control means includes means for rotating said emulsion cut-off tube to control the flow of emulsion into said unshirred portion of tubular casing, means for retracting said sleeve means securing said sizing means distally from said snubbing means to deshirr a predetermined length of casing, and means for advancing said sleeve means and sizing means after a predetermined time interval toward said snubbing means to regulate tension of said deshirred casing.

29. Apparatus according to claim 28 wherein said control means further includes means for varying said time interval and means for regulating the distance of advance and retraction of said sleeve means.

30. A method for controlling the uniformity of stuffed diameter and conformation of the terminal ends of an encased product which comprises:

a. positioning a closed end shirred tubular casing article containing a sizing means and having a leading end unshirred portion of casing length secured by a closure, onto a movably mounted support sleeve of a stuffing horn assembly;

b. moving said support sleeve and sizing means to deshirr a predetermined length of casing at the beginning of a first cycle and for successive cycles;

c. introducing a pressurized emulsion through a central support tube into said deshirred portion of shirred tubular casing article;

d. providing and regulating a time interval for returning said sizing means and deshirred casing length to impose a predetermined tension on said casing length to provide a controlled shape leading end of said encased product;

e. continuing the stuffing of said casing with emulsion after formation of said shaped leading end by continually feeding emulsion into said casing while regulating the diameter by passing the casing length over said sizing means and through an annular ring to provide a snubbing force;

f. controlling the shape of the trailing end of the stuffed encased product by providing and regulating a time interval for advancing and retracting said sizing means to deshirr a predetermined length of casing and impose a predetermined sizing tension on said casing length to provide a controlled shaped trailing end of said product;

g. gathering said trailing end and applying a trailing end closure thereto;

h. advancing the stuffed encased product and applying a leading end closure to a succeeding casing length adjacent said trailing end closure; and thereafter, i. severing the stuffed closed product from the succeeding casing length and doffing the product from a product conveyor.

31. Method according to claim 30 wherein said encased product is an encased food product.

*32. An apparatus for controlling the uniformity of stuffed diameter and conformation of the terminal ends of an encased product comprising in combination, a frame; a stuffing horn assembly including a support tube having an inlet end and a discharge end for conveying emulsion from a supply source and a sleeve means axially movably mounted with respect to said support tube and adapted to mount and secure a shirred tubular casing on said sleeve means; snubbing means associated with said stuffing horn assembly and adapted to be advanced and retracted from said stuffing horn assembly and further adapted to provide a closure means adapted for enclosing an encased product after a predetermined stuffing length; motive means to operate said sleeve means and snubbing means to regulate the position of said snubbing means and the position of said sleeve means relative to said snubbing means; and control means operatively associated with said stuffing horn assembly and said snubbing means to selectively control a cycle of successive stuffing and closing operations, thereby producing a stuffed closed encased product of predetermined length and diameter with controlled shape of the leading and trailing ends of said product.*

*33. Apparatus according to claim 32 wherein said support tube is of generally cylindrical configuration and wherein said stuffing horn assembly includes an emulsion cut-off tube concentrically disposed and rotatably trunnioned on said support tube.*

*34. Apparatus according to claim 33 wherein said emulsion cut-off tube and said support tube coact to provide means to control the flow of emulsion through said support tube.*

*35. Apparatus according to claim 33 wherein said sleeve means includes a support sleeve slidably journaled on said emulsion cut-off tube.*

*36. Apparatus according to claim 32 wherein said snubbing means includes a snubbing carriage adapted to be axially aligned with said support tube and adapted to be advanced and retracted longitudinally over one end of said stuffing horn assembly, and includes a restraining means for restraining a deshirred portion of a mounted tubular casing during stuffing of said mounted casing.*

*37. Apparatus according to claim 36 wherein said restraining means comprises an annular snubbing ring.*

*38. Apparatus according to claim 32 wherein said sleeve means contains locking elements which coact to provide locking means adapted to secure a sizing means to said sleeve means, thereby providing means for mounting a shirred tubular casing on said sleeve means.*

*39. Apparatus according to claim 32 wherein said control means includes means for retracting said sleeve means distally from said snubbing means to deshirr a predetermined length of a mounted shirred tubular casing, and means for advancing said sleeve means after a predetermined interval toward said snubbing means to regulate tension of said deshirred casing.*

*40. Apparatus according to claim 39 wherein said control means further includes means for varying a time interval and means for regulating the distance of advance and retraction of said sleeve means.*

*41. An apparatus for controlling the uniformity of stuffed diameter and conformation of the terminal ends of an encased product comprising in combination, a frame; a stuffing horn assembly including a support tube having an inlet end and a discharge end for conveying emulsion from a supply source and a sleeve means axially movably mounted with respect to said support tube; a casing sizing means confined within an unshirred portion of a closed end of a shirred tubular casing, said sizing means being secured on said sleeve means to mount said casing thereon; snubbing means associated with said stuffing horn assembly and adapted to be advanced and retracted from said stuffing horn assembly, and further adapted to provide a closure means adapted for enclosing an encased product after a predetermined stuffing length; motive means to operate said sleeve means and said snubbing means to regulate a restraining force on said unshirred portion of casing positioned on said sizing means by varying the clearance between said sizing means and said snubbing means; and control means operatively associated with said stuffing*

*horn assembly and snubbing means to selectively control a cycle of successive stuffing and closing operations, thereby producing a stuffed closed encased product of predetermined length and diameter with controlled shape of the leading and trailing ends of said product.*

*42. Apparatus according to claim 41 wherein said support tube is of generally cylindrical configuration and wherein said stuffing horn assembly includes an emulsion cut-off tube concentrically disposed and rotatably trunnioned on said support tube.*

*43. Apparatus according to claim 42 wherein said emulsion cut-off tube and said support tube coact to provide means to regulate flow of emulsion through said support tube.*

*44. Apparatus according to claim 42 wherein said sleeve means includes a support sleeve slidably journaled on said emulsion cut-off tube.*

*45. Apparatus according to claim 41 wherein said snubbing means includes a snubbing carriage adapted to be axially aligned with said support tube and adapted to be advanced and retracted longitudinally over one end of said stuffing horn assembly, and includes a restraining means for restraining said deshirred portion of said tubular casing during stuffing of said tubular casing.*

*46. Apparatus according to claim 45 wherein said restraining means comprises an annular snubbing ring.*

*47. Apparatus according to claim 41 wherein said sizing means and sleeve means contain locking elements which coact to provide locking means adapted to detachably secure said sizing means to said sleeve means.*

*48. Apparatus according to claim 41 wherein said control means includes means to control the flow of emulsion into said unshirred portion of tubular casing, means for retracting said sleeve means securing said sizing means distally from said snubbing means to deshirr a predetermined length of casing, and means for advancing said sleeve means and sizing means after a predetermined interval toward said snubbing means to regulate tension of said deshirred casing.*

*49. Apparatus according to claim 48 wherein said control means further includes means for varying a time interval and means for regulating the distance of advance and retraction of said sleeve means.*

*50. A method for controlling the uniformity of stuffed diameter and conformation of the terminal ends of an encased product which comprises:*

*(a) positioning a closed end shirred tubular casing article containing a sizing means and having a leading end unshirred portion of casing length secured by a closure, onto a movably mounted support sleeve of a stuffing horn assembly;*

*(b) moving said support sleeve and sizing means to deshirr a predetermined length of casing at the beginning of a first cycle and for successive cycles;*

*(c) introducing a pressurized emulsion through a support tube into said deshirred portion of shirred tubular casing article;*

*(d) returning said sizing means and deshirred casing length to impose a predetermined tension on said casing length to provide a controlled shape leading end of said encased product;*

*(e) continuing the stuffing of said casing with emulsion after formation of said shaped leading end by continually feeding emulsion into said casing while regulating the diameter by passing the casing length over said sizing means and through an annular ring to provide a snubbing force;*

*(f) controlling the shape of the trailing end of the stuffed encased product by advancing and retracting said sizing means to deshirr a predetermined length of casing and impose a predetermined sizing tension on said casing length to provide a controlled shaped trailing end of said product; and,*

*(g) gathering said trailing end and applying a trailing end closure thereto, thereby providing a stuffed encased product.*

*51. The method of claim 50 which comprises in step (d), providing and regulating a time interval for returning said sizing means and deshirred casing length.*

*52. The method of claim 50 which comprises in step (f), providing and regulating a time interval for advancing and retracting said sizing means.*

*53. The method of claim 50 including the steps of advancing the stuffed encased product and applying a leading end closure to a succeeding casing length adjacent said trailing end closure.*

*54. The method of claim 53 including the step of severing the stuffed product from the succeeding casing length.*

*55. The method of claim 51 which comprises in step (f), providing and regulating a time interval for advancing and retracting said sizing means.*

*56. The method of claim 55 including the steps of advancing the stuffed encased product and applying a leading end closure to a succeeding casing length adjacent said trailing end closure.*

*57. The method of claim 56 including the step of severing the stuffed product from the succeeding casing length.*

* * * * *